United States Patent [19]
Itoi et al.

[11] Patent Number: 5,439,197
[45] Date of Patent: Aug. 8, 1995

[54] FLOW RATE CONTROL VALVE

[75] Inventors: Shigeru Itoi; Tetsuya Kojima, both of Osaka, Japan

[73] Assignee: Masako Kiyohara, Kumamoto, Japan

[21] Appl. No.: 297,551

[22] Filed: Aug. 31, 1994

[30] Foreign Application Priority Data

Sep. 17, 1993 [JP] Japan .................. 5-230612

[51] Int. Cl.⁶ ................... F16K 35/00; F16K 7/16
[52] U.S. Cl. ................... 251/95; 251/104; 251/229; 251/276; 251/331
[58] Field of Search ............. 70/175, 176, 177, 178, 70/188, 218, DIG. 31, 224; 251/81, 89, 95, 102, 104, 105, 106, 112, 113, 266, 267, 268, 269, 270, 331, 229, 276, 278; 174/424.8 VA

[56] References Cited

U.S. PATENT DOCUMENTS

| | | | |
|---|---|---|---|
| 3,210,040 | 10/1965 | Thurlow | 251/96 |
| 3,280,836 | 10/1966 | Callahan, Jr. et al. | 251/205 |
| 3,622,118 | 11/1971 | Schadler | 251/81 |
| 3,637,188 | 1/1972 | Ung | 251/266 |
| 3,840,041 | 10/1974 | McMurray | 251/89 |
| 4,471,801 | 9/1984 | Lange | 70/176 |
| 4,620,428 | 11/1986 | Kopesky | 70/175 |
| 4,687,180 | 8/1987 | Simonelli et al. | 251/205 |
| 5,295,660 | 3/1994 | Honma | 251/331 |
| 5,295,662 | 3/1994 | Yamaji et al. | 251/331 |

FOREIGN PATENT DOCUMENTS 5-79570  9/1991  Japan .

*Primary Examiner*—George L. Walton
*Attorney, Agent, or Firm*—Griffin, Butler, Whisenhunt & Kurtossy

[57] ABSTRACT

In a flow rate control valve having a handle (12) for rotating a stem (9), the handle being locked to a bonnet (3) by a lock screw (14), the handle (12) comprises a handle main body (12') fixed to an upper end of the stem (9), and a tubular lock handle (12") coupled to the lower end of the handle main body (12'). The lock handle is movable in a direction orthogonal to an axial line of elongation Y of the stem 9 relative to the handle main body, with the lock handle enclosing the upper outer circumference of the bonnet (3), and the lock screw (14) being movable in the lock handle (12") in a direction nearly orthogonal to the axial line of elongation Y of the stem (9) to engage the bonnet (3).

6 Claims, 4 Drawing Sheets

FLOW RATE CONTROL VALVE

BACKGROUND OF THE INVENTION

The present invention relates to flow rate control valves for use in fluid passages mainly in semiconductor manufacturing apparatus and nuclear power generation plants, and more particularly it relates to diaphragm type flow control valves capable of finely adjusting a flow rate.

PRIOR ART

Generally control valves for controlling high purity gases used in semiconductor manufacturing apparatus, or the like, are strictly required to possess particle-free and dead space-free characteristics. In the field of semiconductor manufacture, therefore, diaphragm type control valves (especially direct touch type diaphragm valves) are widely used because they, structurally, easily meet the particle-free and dead space-free requirements.

A diaphragm type control valve has, however, generally a very small working stroke for its diaphragm, and is not suited, by its nature, for adjustments of its flow rates. In particular, it is extremely difficult to finely adjust its flow rates by manual operation.

Accordingly, to solve such problems, the named inventors herein have developed a diaphragm type control valve with which flow rates can be finely and accurately adjusted by manual operation, and that known device was disclosed in Laid-open Japanese Patent Application No. 5-79570.

That known control valve comprises, as is shown in FIG. 5 herein, a body 30 possessing a fluid passage 30a, a valve seat 30c and a valve chamber 30b, a diaphragm 31 contacting and separating from the valve seat 30c, a tubular bonnet 33 with its lower end inserted into the valve chamber 30b to hold a peripheral edge of the diaphragm 31 air tight via a holding adapter 32 and having a female threaded part 33a at an upper inner circumference, a bonnet nut 34 for fixing the bonnet 33 to the body 30, a disk 36 accommodated internally at a lower end of the bonnet 33 and having a diaphragm holder 35, a tubular slide stem 37 slidably, but non-rotationally, held in the bonnet 33 above the disk 36 and having at an inner circumference a female threaded part 37a with a smaller thread pitch than the thread pitch of the female threaded part 33a of the bonnet 33, a rotary stem 38 having, concentrically, both an interior first male threaded part 38a to be engaged with the female threaded part 37a of the slide stem 37 and an exterior second male threaded part 38b to be engaged with the female threaded part 33a of the bonnet 33 (thereby elevating and lowering the slide stem 37 by its rotation), a nearly tubular handle 39 affixed at the upper end of the rotary stem 38 with a lower end thereof enclosing the upper outer circumference of the bonnet 33, and a handle lock screw 40 provided in the handle 39.

In FIG. 5 reference numeral 41 denotes a spring, 42 is a panel fixing nut, 43 is a rotation locking screw, 44 is an indicator, 45 is a cap nut and 46 is a stop.

In the control valve shown in FIG. 5, when the rotary stem 38 is rotated by rotary manipulation of the handle 39, the rotary stem 38 rotates and moves up or down because of engagement between its second male threaded part 38b and the female threaded part 33a of the bonnet 33.

When the rotary stem 38 ascends or descends, while rotating, the slide stem 37 is caused to move up or down (while being held against rotation) by the rotation of the inside first male threaded part 38a engaging the female threaded part 37a of the slide stem 37. That is, when the rotary stem 38 makes one revolution, the slide stem 38 moves up or down by a distance equal to a difference between the thread pitch of the second male threaded part 38b and a thread pitch of the first male threaded part 38a.

Therefore, in this control valve, by properly setting the thread pitch difference of the first male threaded part 38a and the second male threaded part 38b, the ascending or descending extent of the slide stem 37 corresponding to the rotation of the rotary stem 38, that is a stroke of the diaphragm 31, can be adjusted very finely. As a result, fine flow rate adjustment of high precision is realized by manual operation, and hence excellent practical effects are brought about.

PROBLEMS THAT THE INVENTION IS TO SOLVE

Generally, there are two known methods of using this control valve. One is a method of using it to adjust a fluid flow rate by continuously opening or closing the valve with the handle 39. The other method is to cause a fluid flow at a specific flow rate by fixing, in advance, a degree of opening of the valve at a set value.

In the latter method, when the flow rate reaches the set flow rate by rotating the handle 39, the handle 39 is fastened to the bonnet (or to cap nut 45 which is mounted on the bonnet) by the lock screw 40 to prevent the stems 37, 38 from relative rotation and thereby from moving up or down, so that the flow rate may be kept at a set value.

In this known control valve, however, when the lock screw 40 is tightened, the handle 39 moves in a direction orthogonal to an axial line of elongation of the handle 39 by a distance equal to a gap between an inner circumference of the handle 39 and the bonnet 33 (or cap nut 45 and indicator 44 which are mounted on the bonnet). As a result, the stems 37, 38 are dislocated (or moved) by being subjected to a pressing force in the same direction as the handle 39, and the set flow rate may vary to a different value after the handle 49 is locked from that which existed before the handle is locked. In particular, since the control valve is for fine flow rate adjustment, even if the stems 37, 38 are slightly dislocated, the set flow rate fluctuates, which is a serious problem.

This invention is devised to solve this problem, and it is an object thereof to provide a flow rate control valve of a type described above in which a set flow rate does not change before and after locking, when its handle is locked, in order to maintain a desired degree of valve opening.

SUMMARY OF THE INVENTION

According to principles of this invention, a flow rate control valve has a stem supported on a body defining a fluid passage, a valve chamber, and a valve seat. The stem is rotatable in, and elevatable through, a bonnet mounted on the housing, there being a handle affixed to an upper end of the stem for rotational manipulation thereof and for enclosing an upper outer circumference of the bonnet. The handle has a lock screw capable of contacting the bonnet for locking the handle to the bonnet upon tightening the lock screw. The handle is composed of a handle main body fixed to an upper end of the stem and a tubular lock handle enclosing the upper outer circumference of the bonnet and being coupled to the lower end of the handle main body, while being movable in a direction orthogonal to an axial line of elongation of the stem relative to the handle main body. The lock screw is provided in the lock handle to move in a direction substantially orthogonal to the axial line of elongation of the stem.

By tightening the lock screw provided in the lock handle, only the lock handle moves in a direction orthogonal to the axial line of elongation of the stem by a distance corresponding to a gap between an inner circumference of the lock handle and the bonnet, and the inner circumference of the lock handle is pressed against the bonnet outer surface. As a result, the handle is locked, and the stem can neither rotate nor move up or down.

In this flow rate control valve, when the handle is locked, only the lock handle moves in a direction orthogonal to the axial line of elongation of the stem, and the handle main body, fixed on the stem, is not subjected to the pressing force applied in the direction in which the lock handle is moved; accordingly, the stem is not subject to the pressing force in this direction. As a result, the dislocation of the stem due to locking the handle can be prevented, and there is no change in a set flow rate between before and after the handle is locked.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
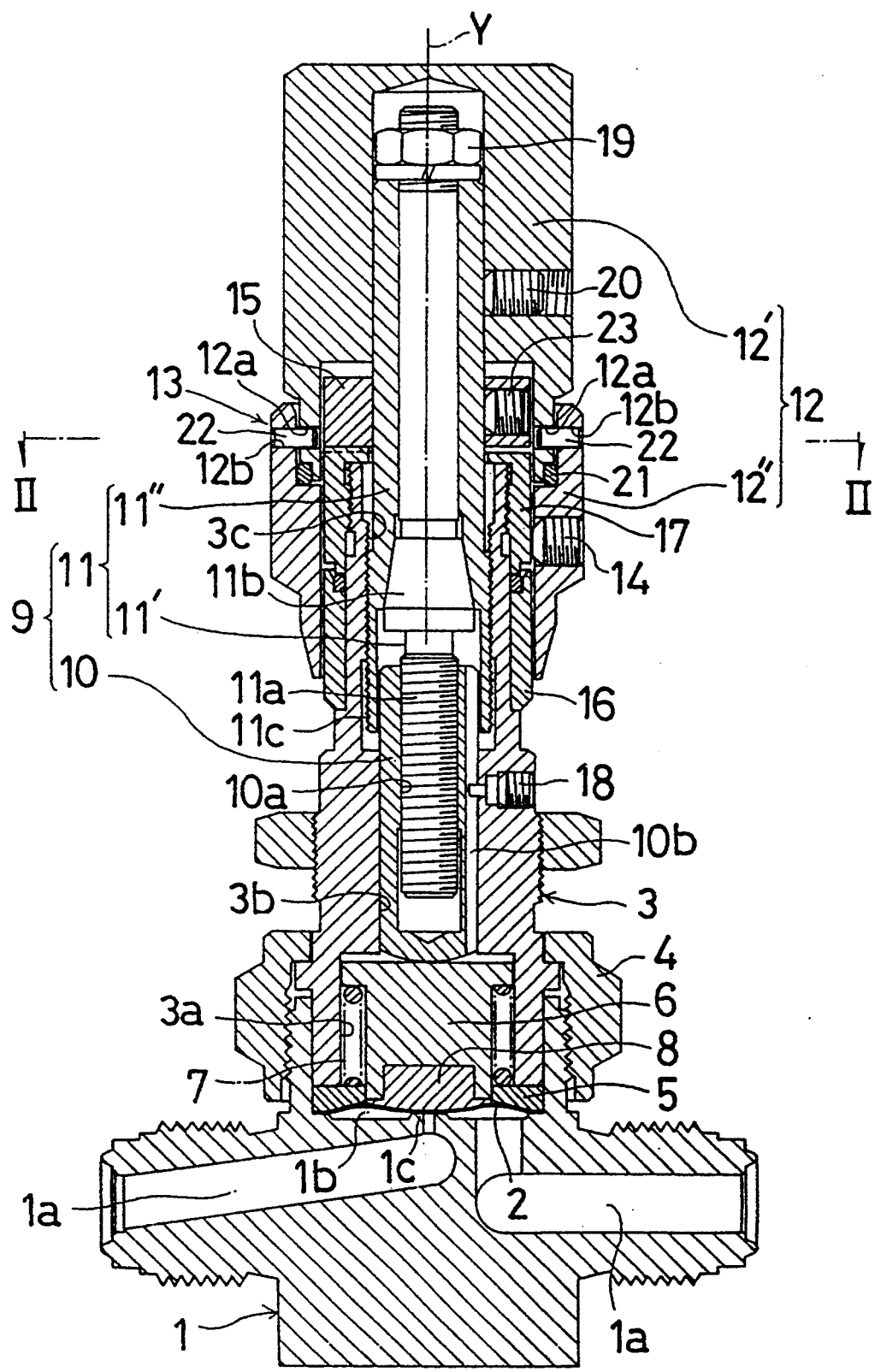
FIG. 1 is magnified longitudinal sectional view of a diaphragm type flow control valve in an embodiment of the invention.

FIG. 1 is a longitudinal sectional view of a diaphragm type flow rate control valve according to an embodiment of this invention, with the control valve being designed to control a fine flow rate at high precision by manual operation, and also to open and close a fluid passage 1a by causing a diaphragm 2 to directly contact or separate from a valve seat 1c.

In FIG. 1, reference numeral I denotes a body, 2 is the diaphragm, 3 is a bonnet, 4 is a bonnet nut, 5 is a holding adapter, 6 is a disk, 7 is a spring, 8 is a diaphragm holder, 9 is a stem comprised of a slide stem 10 and a rotary stem 11, 12 is a handle, 13 is a coupling mechanism, 14 is a lock screw, and 15 is a stop.

The body i is made of material such as stainless steel, and formed substantially in the shape of a cross in cross section, with the fluid passage 1a being formed on the inside thereof. Above the body 1, a concave valve chamber 1b, with an open top communicating with the fluid passage 1a, is formed, with the valve seat 1c being integrally formed with the body 1 at a bottom of the valve chamber 1b.

The diaphragm 2 is made of a thin metal plate of stainless steel, spring steel, shape memory alloy or the like, and formed in a dish form swelling, or bulging, in an upward direction at its middle part, with its outer periphery being placed at an outer periphery of a bottom of the valve chamber 1b, and with the middle part being allowed to move down and up to alternately contact and separate from the valve seat 1c. An outer edge of the diaphragm 2 is pressed to the bottom of the valve chamber 1b by tightening the bonnet nut 4, which is threadedly engaged with the body 1, to be held and fixed in an airtight state by the annular holding adapter 5 extending into the valve chamber 1b and a lower end of the bonnet 3.

The bonnet 3 is formed in a tubular shape with an interior diameter of a lower part inserted into the body 1 being large for accommodating at 3a the disk 6. An interior diameter of a middle part of the bonnet 3 is slightly smaller, with this part serving as a guide part 3b, guiding the slide stem 10 as is explained below. Furthermore, an interior diameter of an upper part of the bonnet 3 is slightly larger, and serves as a female threaded part 3c to be engaged with the rotary stem 11, described below, at an inner circumference thereof. In this embodiment, the thread pitch of the female threaded part 3c is set at 0.55 mm.

The lower end of the bonnet 3 is inserted into the valve chamber 1b in the body 1, and by tightening the bonnet nut 4, is pressed and fixed to the body 1.

A tubular indicator 16 is fitted at the upper outer circumference of the bonnet 3, and a cap nut 17, threadedly mounted on the upper end of the bonnet 3, fastens the indicator 16 thereto.

The disk 6 is slidably inserted into the accommodating part 3a of the bonnet 3, and the diaphragm holder 8, which is made of synthetic resin and which always abuts against an upper surface of the middle of the diaphragm 2, is fitted to its lower end. The disk 6 is always subject to an upwardly thrusting force of the spring 7 applied between the disk and the holding adapter 5.

The stem 9 is movably mounted in the bonnet 3, and presses down on the disk 6 and the diaphragm holder 8 to cause the middle of the diaphragm 2 to contact the valve seat 1c, and it is comprised of the slide stem 10 and rotary stem 11.

That is, the slide stem 10 is hollow, and it is slidably mounted in the bonnet 3, but it is keyed against rotation, with its lower end abutting against the disk 6. In this embodiment, the slide stem 10 is free to move up and down in the bonnet 3, while not being allowed to rotate by engagement with a front end of a locking screw 18 threadedly fitted in the bonnet 3 at a longitudinal guide groove 10b in the slide stem's outer circumference. At an inner circumferential surface of the slide stem 10, a female threaded part 10a, with a smaller thread pitch than a thread pitch of the female threaded part 3c of the bonnet 3, is formed. In this embodiment, the thread pitch of the female threaded part 10a is set at 0.5 mm.

On the other hand, the rotary stem 11 forms an integral coupling (comprised of a first member 11', having an interior shaft form, and a second member 11'', having exterior tubular form) disposed above, and coaxial with, the slide stem 10, the rotary stem being slidably mounted in the bonnet 3 so that its upper part-may project from above the bonnet 3.

More specifically, the first member 11' is in the form of a shaft with a tapered part 11b in the middle thereof. A first male threaded part 11a, to be engaged with the female thread 10a of the slide stem 10, is formed at a lower outer circumference thereof. The first member 11' is screwed into the slide stem 10 with its upper part projecting from the bonnet 3. In this embodiment, the threaded pitch of the first male threaded part 11a is set at 0.5 mm.

The second member 11'' is in a tubular form, with a second male threaded part 11c, engaged with the female threaded part 3c of the bonnet 3, being formed at a lower outer circumference thereof. The second member 11'' is screwed into the bonnet 3 with an upper portion thereof projecting from the bonnet 3. In this embodiment, the thread pitch of the second male threaded part 11c is set at 0.55 mm.

The first member 11' and second member 11'' are integrally coupled and fixed together by insertion of the first member 11' into the second member 11'', with an upper part thereof projecting through the second member 11'' being tightened thereto by a fixing nut 19. Thus, both members 11', 11'' are aligned with one another by the tapered part 11b, so that the first male threaded part 11a and second male threaded part 11c are concentric.

Thread directions of the female threaded part 3c of the bonnet 3, female threaded part 10a of the slide stem 10, first male threaded part 11a of the first member 11', and the second male threaded part 11c of the second member 11'' are determined such that when the rotary stem 11 is rotated so as to descend, the slide stem 10 also descends.

The handle 12, which is fixed on the upper part of the second member 11'' of the rotary stem 11 by means of a handle fixing screw 20 is composed of a nearly tubular handle main body 12', having a closed upper end, and a tubular lock handle 12'', which lock handle 12'' is loosely mounted on the lower end of the handle main body 12' with an O-ring 21 fitted between the handle main body 12' and lock handle 12'' with the lock handle 12'' being relatively movable in a direction orthogonal to an axial line of elongation Y of the stem 9. The lock handle 12'' encloses the upper outer circumference of the bonnet 3 (including the outer circumference of the indicator 16 and cap nut 17). As the lock handle 12'' rotates and moves up and down along the outer circumference of the indicator 16, the degree of opening of the control valve and the adjusted flow rate can be read directly from the indicator 16.

The coupling mechanism 13 is provided at engagement parts of the handle main body 12' and the lock handle 12'' for coupling the handle main body 12' and the lock handle 12'' while allowing the lock handle 12'' to be movable relative to the main body 12', but only substantially in a direction orthogonal to the axial line of elongation Y of the stem 9.

Figure 2:
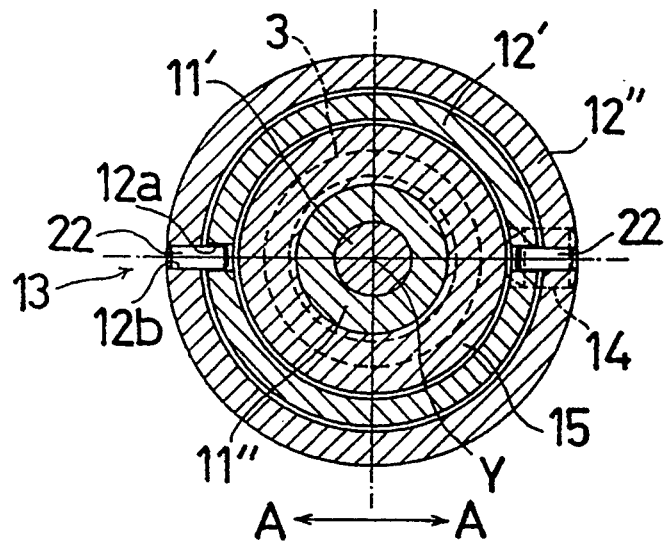
FIG. 2 is a magnified sectional view taken along line II—II in FIG. 1.
Figure 3:
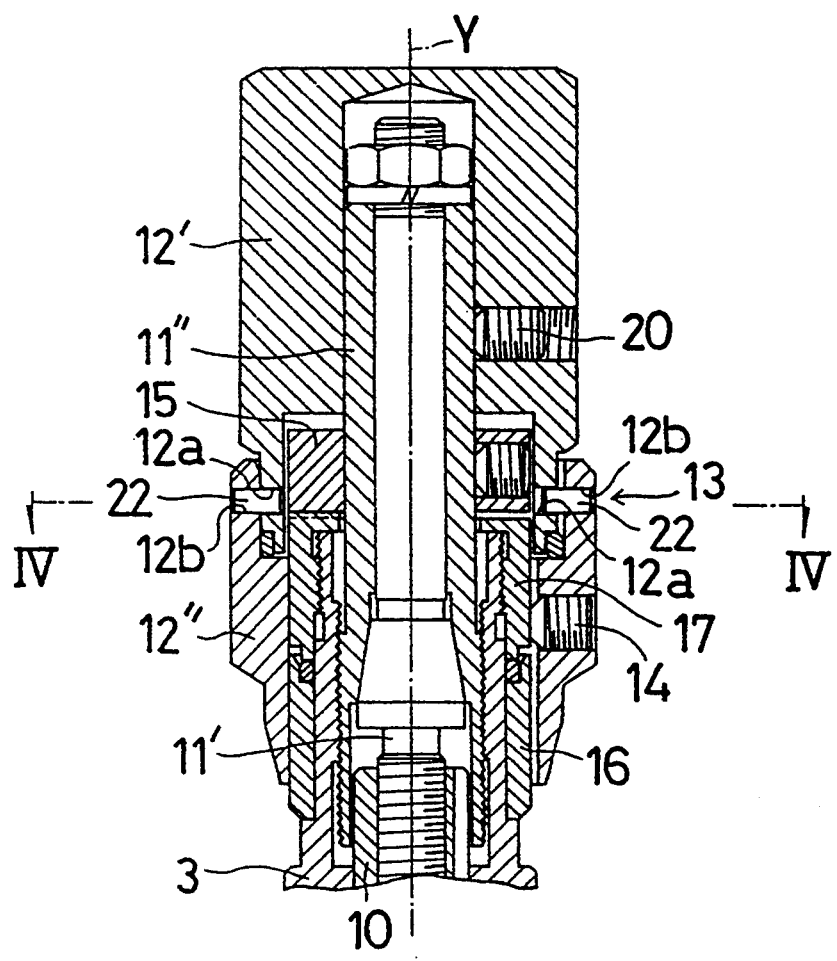
FIG. 3 is a magnified longitudinal sectional view of essential parts of the embodiments of FIG. 1 in a handle locked state.
Figure 5:
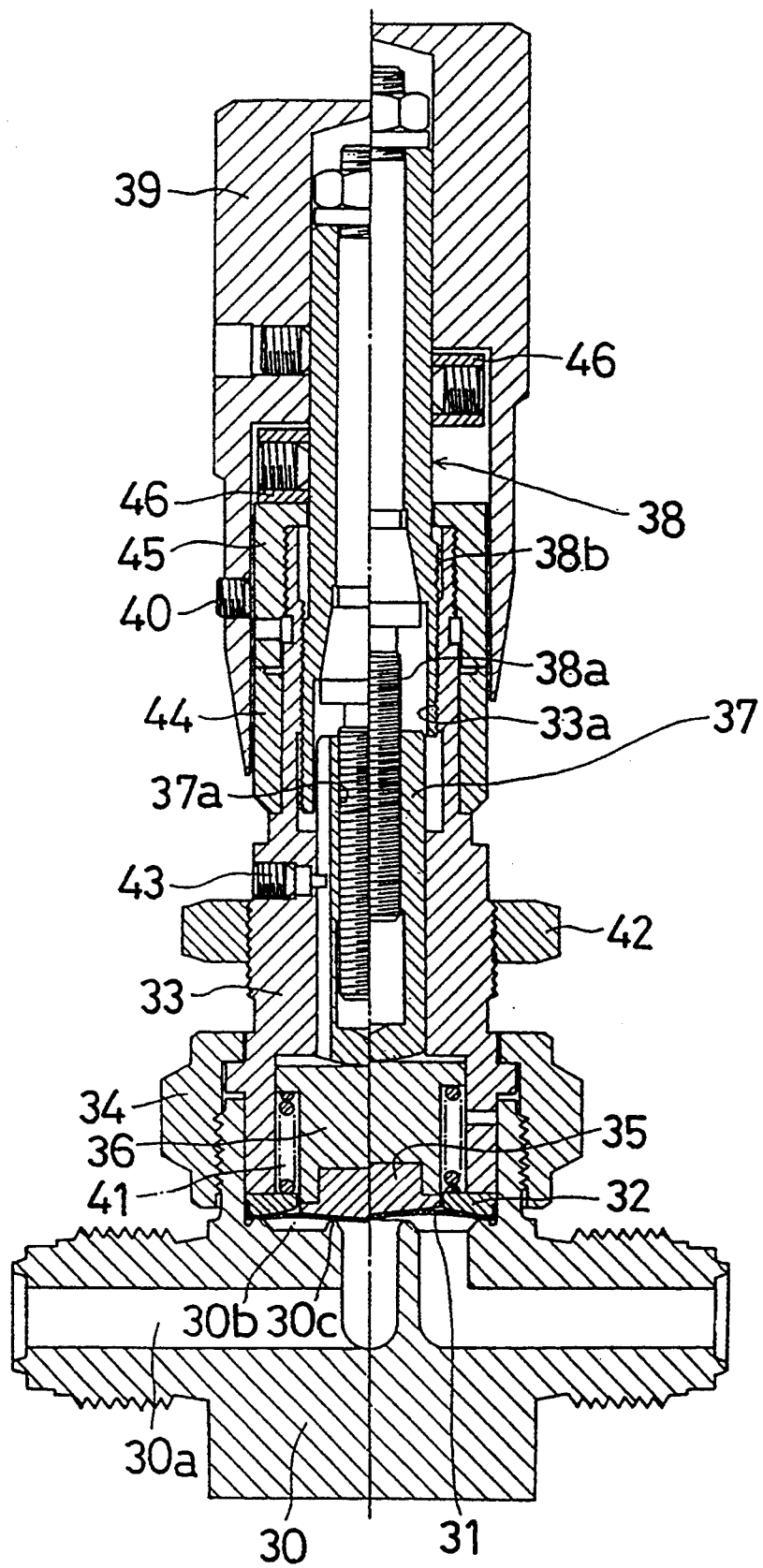
FIG. 5 is a longitudinal sectional view of a conventional diaphragm type control valve.

More specifically, as shown in FIGS. 2 and 3, the coupling mechanism. 13 employs a pair of opposite guide holes 12a in the lower end of the handle main body 12' extending in a direction orthogonal to the axial line of elongation of the handle 12 and a pair of mounting holes 12b pierced in the upper end of the lock handle 12'', adjacent the guide holes 12a, and comprises a pair of guide pins 22 force-fitted in the mounting holes 12b at one end and clearance-fitted in the guide holes 12a at the other end. Thus, the two guide pins 22 permit the lock handle 12'' to be movable in an axial line of elongation direction (arrow A—A direction in FIGS. 2 and 4) of the guide pins 22, only by a distance equal to a gap between an inner circumference of the lock handle 12'' and an outer circumference of the indicator 16 and cap nut 17, but make it immovable, relative to the main body 12', in a rotating direction.

The lock screw 14 is screwed into the lock handle 12'', to fasten the lock handle 12'' to the bonnet 3 via the cap nut 17.

In the present embodiment, the lock screw 14 is screwed into the lock handle 12'' in a direction orthogonal to the axial line of elongation Y of the stem 9 and parallel to the axial line of elongation of the two guide pins 22, while its forward end abuts against the outer circumferential surface of the cap nut 17.

The stop 15 is annular, and is fitted around the upper outer circumference of the second member 11'' of the rotary stem 11 to be fixed to the second member 11'' by the fixing screw 23, and to abut against the top surface of the cap nut 17 when the rotary stem 11 is used for fully closing the control valve (when the middle of the diaphragm 2 is seated on the valve seat 1c), thereby preventing further descent of the stem 9.

The position at which the stop 15 is fixed is set so that the stop 15 and cap nut 17 contact each other when the rotary stem 11, slide stem 10 and disk 6 are lowered and the diaphragm 2 is seated on the valve seat 1c.

Operation of the flow control valve is described below.

When the handle 12 is alternately rotated in opposite directions, the rotary stem 11 also rotates in these directions, and the rotary stem 11, correspondingly, is moved up or down, depending on the direction of rotation, by means of engagement of the second member 11'' of the rotary stem 11 with the bonnet 3.

As the rotary stem 11 moves up and down while rotating, the slide stem 10, engaged with the first member 11' of the rotary stem 11, is moved up and down, while being locked against rotation by engagement of the locking screw 17 in the guide groove 10b. At this time, the slide stem 10 moves up and down by a distance equal to a difference between the thread pitch of the second male threaded part 11c and the thread pitch of the first male threaded part 11a per revolution of the handle 12. In this embodiment, the slide stem 10 moves up and down by 0.05 mm per revolution of the handle 12.

When the slide stem 10 descends, the middle of the diaphragm 2 is pushed down by the disk 6 and diaphragm holder 8 to abut against the valve seat 1c. When the slide stem 10 ascends, the disk 6 is raised by a thrusting force of the spring 7, while the diaphragm 2 restores its original shape by elasticity and fluid pressure, thereby moving away from the valve seat 1c. As a result, the effective flowing area of the fluid passage 1a is adjusted by the diaphragm 2, and the flow rate of the fluid is controlled.

The degree of valve opening and flow rate are read directly from the indicator 16 below a lower end edge of the lock handle 12''.

The control valve moves the slide stem 10 up and down by the thread pitch difference between the first male threaded part 11a and second male threaded part 11c, and therefore an extent of vertical movement of the slide stem 10 per revolution of the rotary stem 11, that is the stroke of the diaphragm 2, can be adjusted very finely, and fine flow rates can be adjusted at high precision, even by manual operation.

When closing the control valve, the stop 15, provided on the second member 11", abuts against the top surface of the cap nut 17 to stop descent of the rotary stem 11, and therefore the handle 12 is not tightened excessively, and damage or breakage of the diaphragm due to excessive tightening is prevented.

In the control valve, moreover, when the handle 12 is rotated and the flow rate reaches a set value, the handle 12 can be locked and fastened to the bonnet 3 (via cap nut 17) by the lock screw 14, and the rotary stem 11 is thereby prevented from further rotating or moving up and down, so that the flow rate may be maintained at this specified rate.

Figure 4:
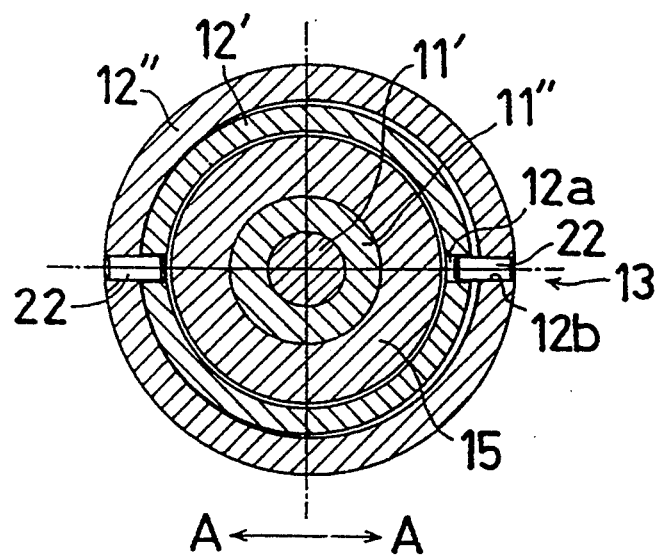
FIG. 4 is a magnified sectional view taken along line IV—IV in FIG. 3.

That is, by tightening the lock screw 14 on the lock handle 12", as shown in FIG. 3 and FIG. 4, since one end of each guide pin 22 is clearance-fitted to the handle main body 12', only the lock handle 12" is forced to move in the axial direction of the guide pins 22 by the distance equal to the gap between the inner circumference of the lock handle 12" and the outer circumference of the indicator 16 and cap nut 17, with the result that a portion of the inner circumference of the lock handle 12" is pressed against the outer circumference of the indicator 16 and the cap nut 17. Thus, the handle 12 is locked, and the rotary stem 11 is prevented from rotating and moving up and down.

When the lock handle 12" is thusly moved in a direction orthogonal to the axial line of elongation Y of the stem 9, the handle main body 12' is not subjected to the pressing force applied in the direction in which the lock handle 12" is pressed and moved, and hence the stem 9 does not receive this force. Accordingly, the stem 9 is not dislocated by locking of the handle 12, and the set flow rate does not change when the handle 12 is locked.

In this embodiment, the diaphragm 2 is designed to directly contact or separate from the valve seat 1c, but by disposing a disk below the diaphragm 2, the disk could be caused to contact with or depart from the valve seat 1c.

In this embodiment, the first member 11' and second member 11" are separate pieces which are coupled and fixed together by the fixing nut 19, but they may be formed integrally as one piece. In the above embodiment, the rotary stem 11 is rotate manually, but may be driven by a motor or the like.

In the described embodiment, the extent to which the rotary stem 11 can descend is restricted by the stop 15 abutting against the top surface of the cap nut 17, but, if the cap nut 17 is not used, the stop 15 may contact the top surface of the bonnet 3 to restrict descending movement of the rotary stem 11.

In the described embodiment, one end of each guide pin 22 is interference (or force) fitted to the mounting hole 12b and the other end is clearance-fitted to the guide hole 12a, but one end of each guide pin 22 may be interference-fitted to the guide hole 12a, and the other end may be clearance-fitted to the mounting hole 12b.

In the described embodiment, the coupling mechanism 13 includes mounting holes 12b, guide holes 12a, and guide pins 22, but the structure of the coupling mechanism 13 is not limited to the above embodiment alone, rather, this structure could be of any type so long as the handle main body 12' and the lock handle 12" are thereby coupled, with only the lock handle 12" being movable in the direction orthogonal to the axial line of elongation Y of the stem 9. For example, a groove (or stop protrusion) may be formed in the lower end surface of the handle main body 12', in a direction orthogonal to the axial line of elongation Y of the handle 12, with an opposite protrusion (or groove) engaged therewith formed in the upper end surface of the lock handle 12", so that the handle main body 12' and lock handle 12" are coupled to be relatively movably in a direction orthogonal to the axial line of elongation Y.

In the described embodiment, the forward end of the lock screw 14 abuts against the cap nut 17, but, if the cap nut 17 is not used, the forward end of the lock screw 14 may contact the outer circumferential surface of the bonnet 3 or the outer circumferential surface of the indicator 16 so as to lock the lock handle 12".

In the invention, as described herein, the handle for rotating the stem is composed of a handle main body fixed to the upper end of the stem and a tubular lock handle mounted loosely on the lower end of the handle main body, coupled in such a manner that the lock handle may be allowed to move in a direction orthogonal to the axial line of elongation of the stem, and enclosing the upper outer circumference of the bonnet. The lock screw is provided in the lock handle in a direction orthogonal to the axial line of elongation of the stem, and therefore if the handle is locked by the lock screw, only the lock handle moves in a direction orthogonal to the axial line of elongation of the stem, while the handle main body does not receive the force in this direction. Hence, the stem does not receive undue force in this orthogonal direction either. As a result, the stem's position is not distorted by locking the handle, and the set flow rate does not change when the handle is locked.

The embodiments of the invention in which an exclusive property or privilege are claimed are defined as follows:

1. A flow rate control valve comprising:
   a body defining a fluid passage, a valve chamber, and a valve seat;
   a tubularly-shaped bonnet supported on said body aligned with said valve seat;
   a stem supported by said tubularly-shaped bonnet and positioned in a passage of said bonnet so as to be aligned with said valve seat, said stem being movable along a length axis of said stem toward and away from said valve seat and being rotatable about said length axis;
   a handle affixed to an outer end of the stem and enclosing an outer circumferential surface of the bonnet for rotating said stem;
   a lock screw threadably mounted in said handle for selectively locking to said bonnet and thereby locking the handle against movement relative to the bonnet;
   wherein said handle comprises a handle main body affixed to the upper end of the stem and a tubular lock handle enclosing the upper outer circumferential surface of the bonnet, said lock handle being coupled to said handle main body by a coupling means between the lock handle and main body for allowing said lock handle to be moveable in a direction orthogonal to the length axis of the stem relative to said main body but, for preventing said lock handle from substantially rotating about and moving along said length axis relative to said main body, and wherein said lock screw, when screwed to selectively lock said lock handle to said bonnet is moved in a direction substantially orthogonal to the length axis of the stem to thereby lock said stem against rotation and linear movement about and along said length axis said stem while is not substantially moved orthogonal to said length axis, even if said lock handle is thereby moved orthogonal to said length axis.

2. A flow rate control valve as in claim 1 wherein said coupling means includes a pair of guide holes in a lower end of the handle main body extending in a direction orthogonal to the axial line of elongation of the handle, a pair of mounting holes in the upper end of the lock handle, each mounting hole being adjacent a guide hole of the main handle, and a pair of guide pins each guide pin being force-fitted in one of the guide and mounting holes and clearance-fitted in the adjacent hole.

3. A flow rate control valve as in claim 2 wherein the guide pins are force-fitted to the mounting holes at first ends of the pins and clearance-fitted to the guide holes at opposite ends of the pins.

4. A flow rate control valve as in claim 1 wherein said coupling means comprises a groove extending in an orthogonal direction to the axial line of elongation of the stem in one of the main body and the lock handle and an interlocking protrusion extending in a direction orthogonal to the axial line of elongation in the other of the main body and the lock handle.

5. A flow rate control valve as in claim 1 wherein the flow control valve is a diaphragm type flow control valve designed to cause a diaphragm to directly contact and separate from the valve seat by means of a sliding motion.

6. A flow rate control valve as in claim 1 wherein the stem moves longitudinally along said length axis of said stem toward and away from the valve seat by a distance corresponding to a difference between two thread pitches for one revolution of the handle.

* * * * *